United States Patent [19]
Yang

[11] Patent Number: 5,844,574
[45] Date of Patent: Dec. 1, 1998

[54] SYSTEM FOR ENABLING A CPU AND AN IMAGE PROCESSOR TO SYNCHRONOUSLY ACCESS A RAM

[75] Inventor: Dennis Ou Yang, Hsinchu, Taiwan

[73] Assignee: Umax Data Systems, Inc., Hsinchu, Taiwan

[21] Appl. No.: 445,692

[22] Filed: May 22, 1995

[51] Int. Cl.⁶ .................................................. G06F 12/06
[52] U.S. Cl. ............................................ 345/516; 345/507
[58] Field of Search ..................................... 395/162, 163, 395/164; 345/200, 186, 27, 28, 516, 501, 507, 508, 511, 512, 520, 521, 522, 526

[56] References Cited

U.S. PATENT DOCUMENTS

| | | | |
|---|---|---|---|
| 4,307,393 | 12/1981 | Hamada et al. | 345/140 |
| 4,546,350 | 10/1985 | Tanaka | 345/28 |
| 4,691,237 | 9/1987 | Shimizu | 358/409 |
| 5,282,268 | 1/1994 | Mieras et al. | 395/164 |

Primary Examiner—Kee M. Tung
Assistant Examiner—Cao H. Nguyen
Attorney, Agent, or Firm—Bacon & Thomas

[57] ABSTRACT

A synchronization system includes an image processor, a RAM, a CPU with an R/W interface, and a time controller. The time controller generates synchronization signals based on image control signals and ALE signals respectively generated by the image processor and the CPU. The image processor and the CPU can access the RAM synchronously according to the synchronization signals.

7 Claims, 5 Drawing Sheets

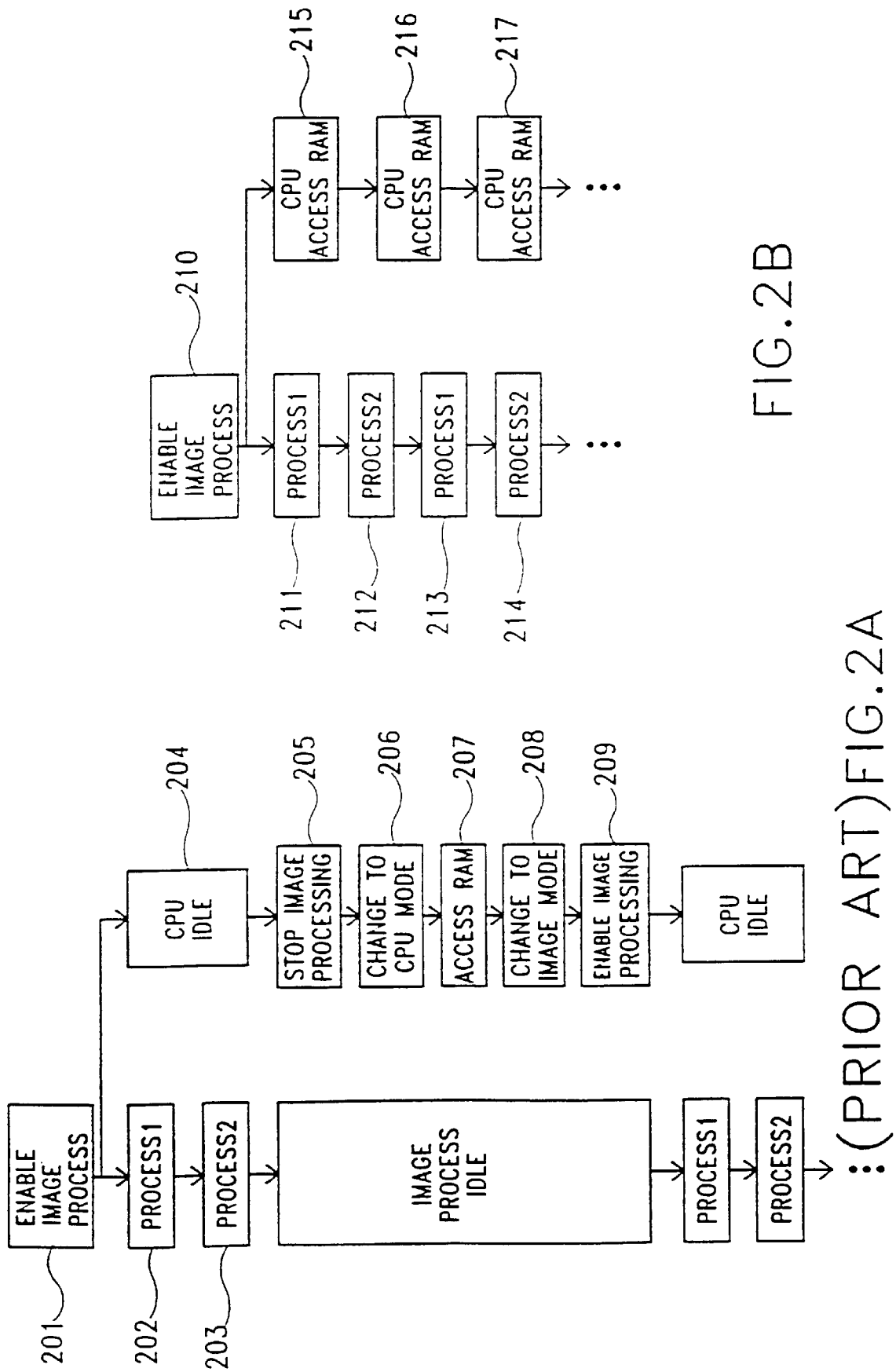

SYSTEM FOR ENABLING A CPU AND AN IMAGE PROCESSOR TO SYNCHRONOUSLY ACCESS A RAM

BACKGROUND OF THE INVENTION

1. Field of the Invention

The present invention relates to a synchronization system for an image reading apparatus, and especially to a synchronization system which allows a CPU and an image processor to synchronously access the same RAM.

2. Description of the Prior Art

Prior art scanners typically included a CPU and an image processor to process image data. Since they share a common RAM, their processing procedures are asynchronous, i.e., a CPU has to wait until an image processor finishes its job while accessing a RAM. This can be illustrated in FIG. 1. Referring to FIG. 1, RAM 101 stores CPU 102 variables, system parameters, and also data required for an image Processor 103 to process images. When CPU 102 needs to process images, it accesses RAM 101 by I/O interface 104. When the image Processor 103 needs to access RAM, it has to wait until CPU 102 finishes accessing RAM. Since these two processes can not be processed synchronously, the idle time for CPU 102 and the image processor 103 is significant.

To improve the efficiency of the system, one solution is to add a second RAM to the system such that one RAM is for the CPU and the other for the image processor so that they do not have to wait until the other finishes its job. Referring to FIG. 1B, RAM 110 is for CPU 112 to store CPU 112 variables and system parameters. The other RAM 111 is for storing the predetermined data for processing images, and parameters and variables. After the implementation of the second RAM, CPU 112 can access RAM 110 without waiting. However, when CPU 112 accesses RAM 111, it still has to go through I/O interface 113 which becomes a bottleneck. Moreover, this modification doubles the number of RAMs used. In other words, it increases the implementation costs.

The asynchronous situation can be further illustrated using a flow chart shown in FIG. 2A. Assume image processing requires two processes: Process 1 and Process 2. When a system needs to process images, it has to enable image process 210. In Process 1 202 and Process 2 203, image process accesses RAM and causes CPU to stop accessing RAM 204.

After Process 1 202 and Process 2 203 are completed, CPU accesses RAM and disables image process 205. The system then changes to CPU mode 206. At this stage, CPU can go ahead to access RAM 207. After CPU finishes accessing RAM 207, the system has to change back to image mode 208, and then enables image process 209. From step 205 to step 209, the CPU is in idle state. This is because the processes of the CPU and the image processor cannot be processed synchronously.

The disadvantages of the prior arts are that the CPU and the image processor need programs to control which time segments are for CPU to access RAM and which time segments are for image processor to access RAM. The control software programs are very complicated. Additionally, the control programs are machine-dependent. For every different hardware design, a different software program is needed to control the changing modes of the CPU and the image processor. This requires a lot of efforts.

SUMMARY OF THE PRESENT INVENTION

It is therefore the primary object of the present invention to provide a signal synchronization system which can enable a RAM to process image data and CPU data synchronously.

It is also an object of the present invention to provide a simple time controller to facilitate a scanner with the function of synchronously processing CPU data and image data.

It is a further object of the present invention to provide an economical signal synchronization system which can perform the function of synchronously processing CPU data and image data with only one RAM.

It is still another object of the present invention to provide a reliable synchronizing system which is applicable to any hardware system without software program control.

These and other objects of the present invention are accomplished by providing a signal synchronization system which incorporates, in its preferred embodiments, image processing device, memory device, a CPU R/W interface, and a time controller. The memory device includes a RAM and a data bus. The function of the RAM is to store predetermined data for image processing, image data, and system parameters and variables. The image processing device includes an image processor, and at least a data register for storing data from the memory device. The image processor has several functions. Its main job is to process pre-processed image data. It receives image data from the data registers, and sends the image data to memory device after they are processed. A CPU R/W interface works as a R/W interface for the CPU and memory device. The CPU R/W interface includes a CPU bus, a data read out device, and a data write in device. The CPU bus is to transfer data from/to the CPU; the data write in device receives data from the CPU bus and sends it to the data bus for the memory device to write; the data read out device receives data from the data bus and sends it to the CPU bus for the CPU to read. Most importantly, the system includes a time controller for the synchronization of the system. The time controller receives a control signal from the CPU and an image process control signal from the image processor, and outputs a synchronization signal to control the data read out device and the data write in device so that the RAM can process CPU data and image data synchronously.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 2A shows a schematic diagram of a prior art;

FIG. 2B shows a schematic diagram of an embodiment of the present invention;

DETAILED DESCRIPTION OF THE PREFERRED EMBODIMENT

Figure 1A:
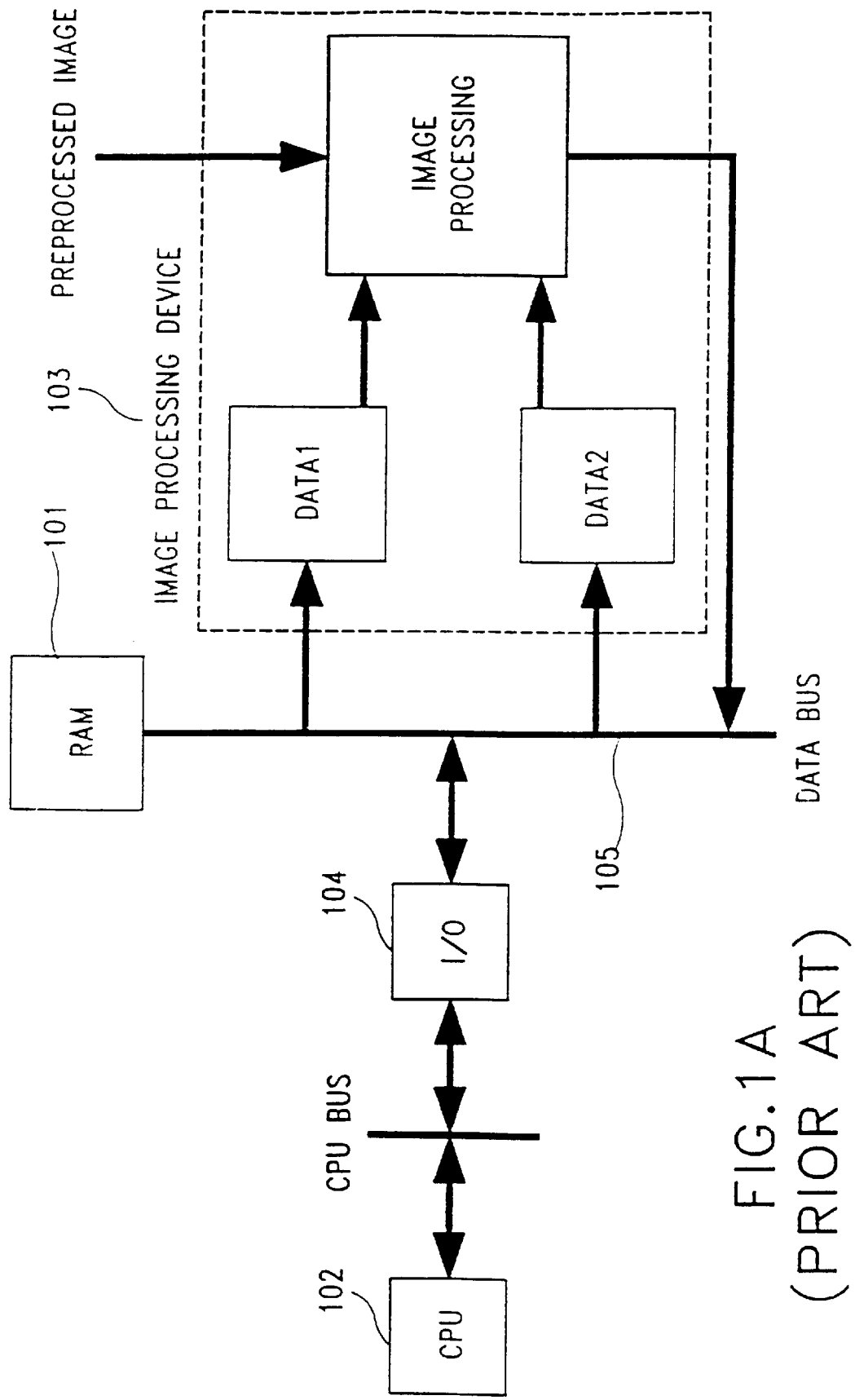
FIG. 1A shows the function blocks of a prior art in which a CPU and an image processor share the same RAM.
Figure 1B:
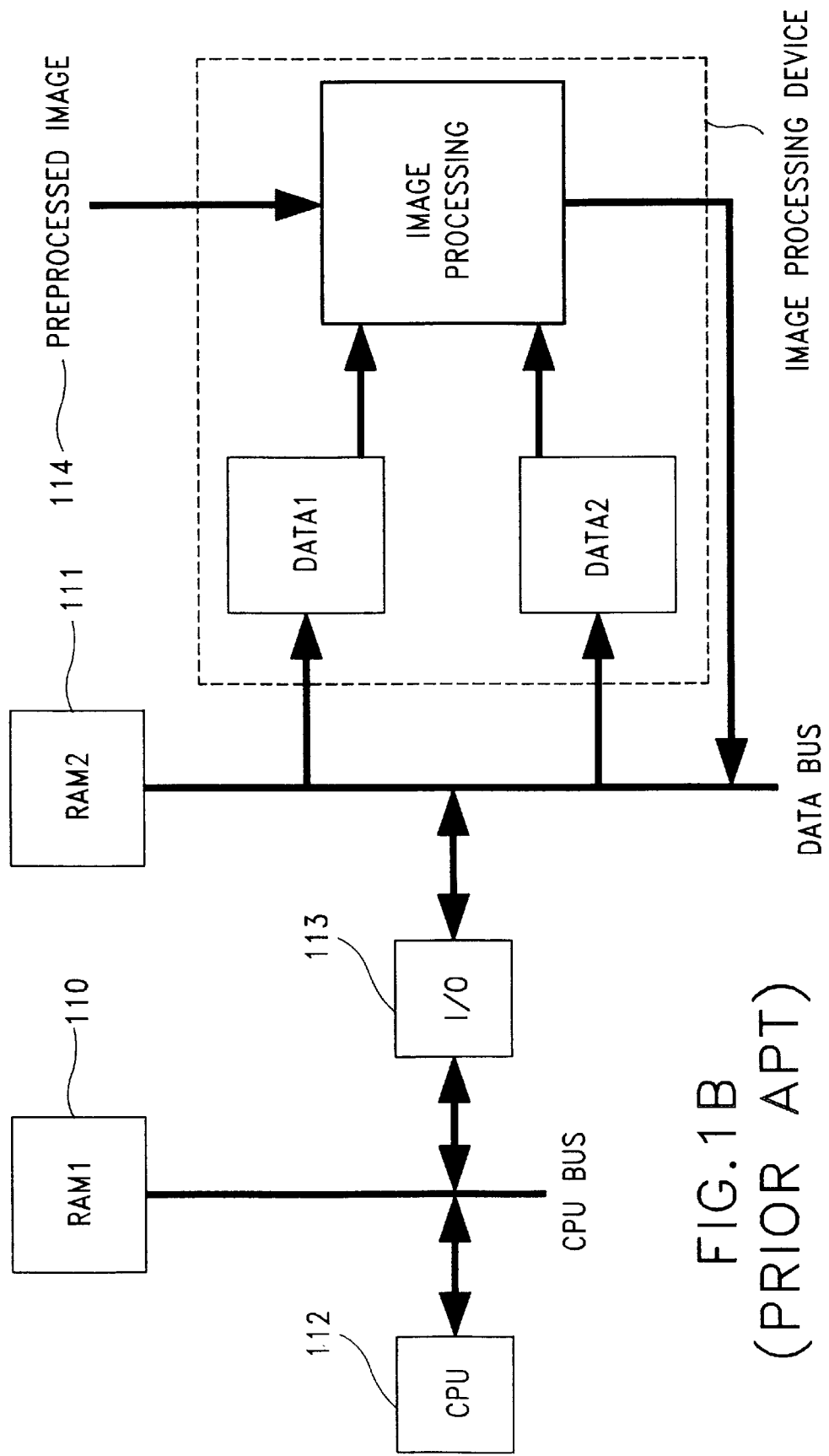
FIG. 1B shows the function blocks of the other prior art in which a CPU and an image processor each having a RAM.

FIG. 2A shows a schematic diagram of a prior art, in which a CPU and an image processor do not access RAM synchronously.

In the prior arts, image processing requires Process 1 and Process 2. Since an image processor and a CPU share the same RAM, the system has to enable image process 210 before it can process images. During Process 1 202 and Process 2 203, image process accesses RAM and disables CPU to access RAM 204.

After Process 1 202 and Process 2 203 finish, CPU may access RAM. Image process has to stop 205, and change to CPU mode 206. After that, CPU can access RAM 207. After CPU finishes accessing RAM, the system has to change back to image mode 208, and then enable image processor 209. From step 205 to 209, the image processor is in idle state. As shown in FIG. 2A, CPU and the image processor both have idle states. This is because they share the same RAM and cannot process data synchronously.

FIG. 2B shows the schematic diagram of the present invention which contains an image processor and a CPU processing data synchronously without containing any idle state. Please referring to FIG. 2B, the left part of the diagram shows the image processing procedures: 211, 212, 213, and 214; the right part of the diagram shows the procedures of CPU accessing RAM: 215, 216, 217. The right part and the left part procedures can work synchronously without containing any idle state.

Figure 3:
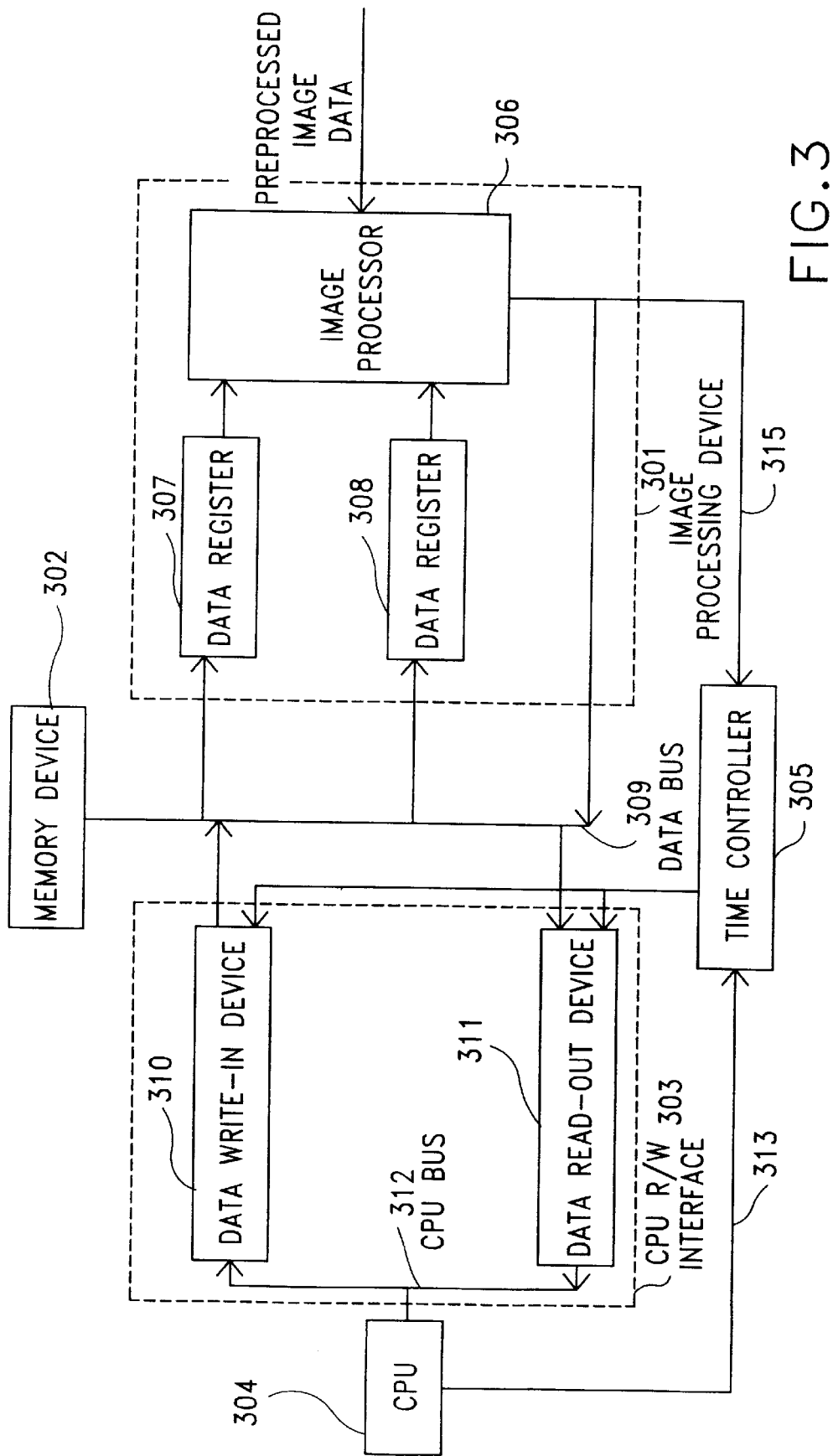
FIG. 3 shows the preferred embodiment of the present invention.

FIG. 3 shows the function blocks of the preferred embodiment of the present invention. It includes: image processing device 301, memory device 302, a CPU R/W interface 303, a CPU 304, and a time controller 305. Memory device 302 includes a RAM 302 and a data bus 309. The function of the RAM is to store predetermined data for image processing, image data, and system parameters and variables.

Image processing device 301 includes an image processor 306, a first data register 307, and a second data register 308. The function of the image processor 306 is to process the image data after the image has been scanned. The processed image data will be transferred to data bus 309 to be further sent to RAM 302. The first and the second data registers store the data coming from data bus 309 for the image processor 306 to read.

CPU R/W interface 303 includes a data write in device 310, a data read out device 311, and a CPU bus 312. The CPU R/W interface 303 is an interface for CPU read/write. During the CPU read cycle, the system will send data stored in RAM 302 through data bus 309 and then store the data in the data read out device 311 for CPU 304 to read. During the CPU write cycle when CPU 304 needs to write the data in RAM 302, the system will send CPU data stored in the data write in device 310 through data bus 309 to be written in RAM 302.

Each microprocessor uses predetermined timing signals and the image processor also uses predetermined timing signals but the respective timing signals are usually not in synchronism with each other. For CPU 304 to randomly access image data from RAM 302, the timing signals of the image processor 306 and the CPU 304 must be synchronized, i.e., the CPU read/write timing signals must be supplied to the image processor 306. This can be achieved by synchronizing the timing signals of the image processor 306 and the CPU 304 according to the machine cycle of the CPU.

The ALE (Address Latch Enable) signal is a pulse to logic 1 that signals external circuitry when a valid address word is on the bus. This address must be latched in external circuitry on the 1–0 edge of the pulse at ALE. The significance of the ALE signal is that it is in synchronism with the machine cycle of the CPU 304, and thus the ALE signal can be use to provide synchronization signals for both the image processor 306 and the CPU 304. For this purpose, at the time when CPU 304 is enabled, it sends timing signals for accessing external memory. The time controller 305 uses the ALE signals as a basis for the clock cycle of image processor 306. Consequently, the timing signals of the image processor 306 and the CPU 304 are in synchronism.

The read/write procedures are controlled by the synchronization signal from the time controller 305. The time controller 305 receives the control signal from CPU 304, which can be an ALE signal, by line 313 and an image process control signal from the image processor 306 by line 315. The time controller 305 synchronizes the two signals and then sends a synchronization signal to data read out device 310 and data write in device 311 to enable the RAM 302 to process the CPU data and the image data synchronously.

Figure 4:
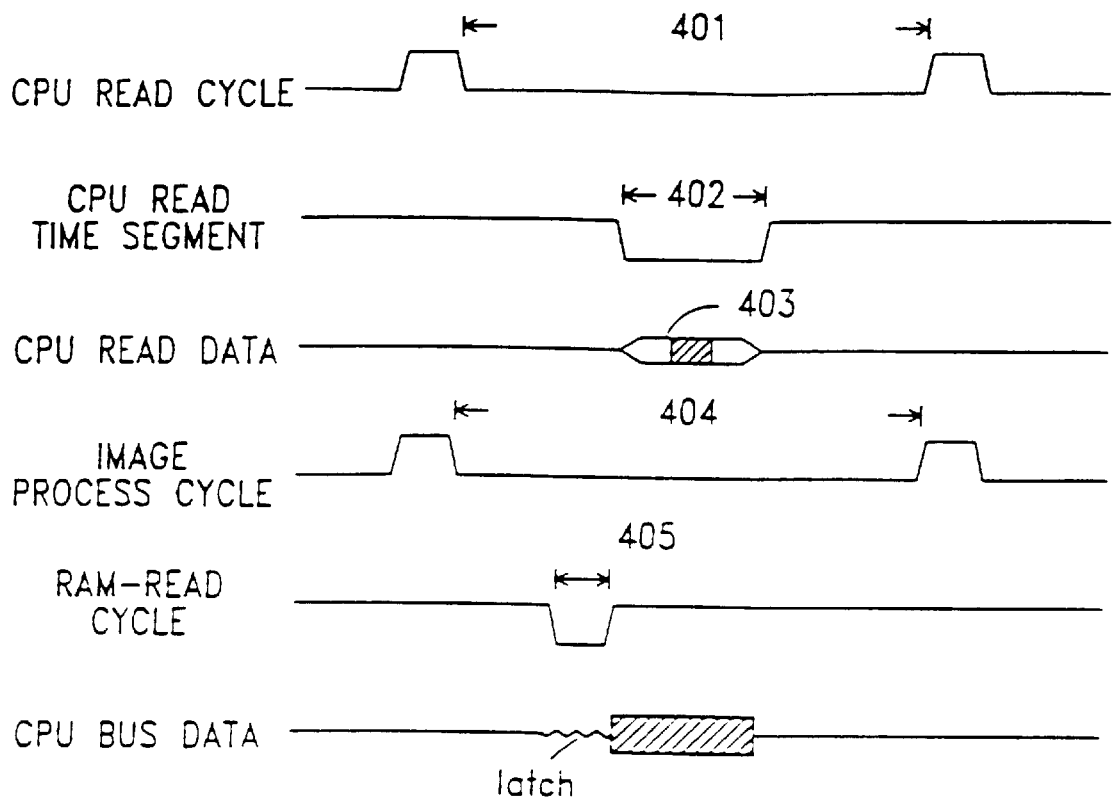
FIG. 4 shows a synchronous timing diagram of a CPU read cycle and an image processor read cycle.
Figure 5:
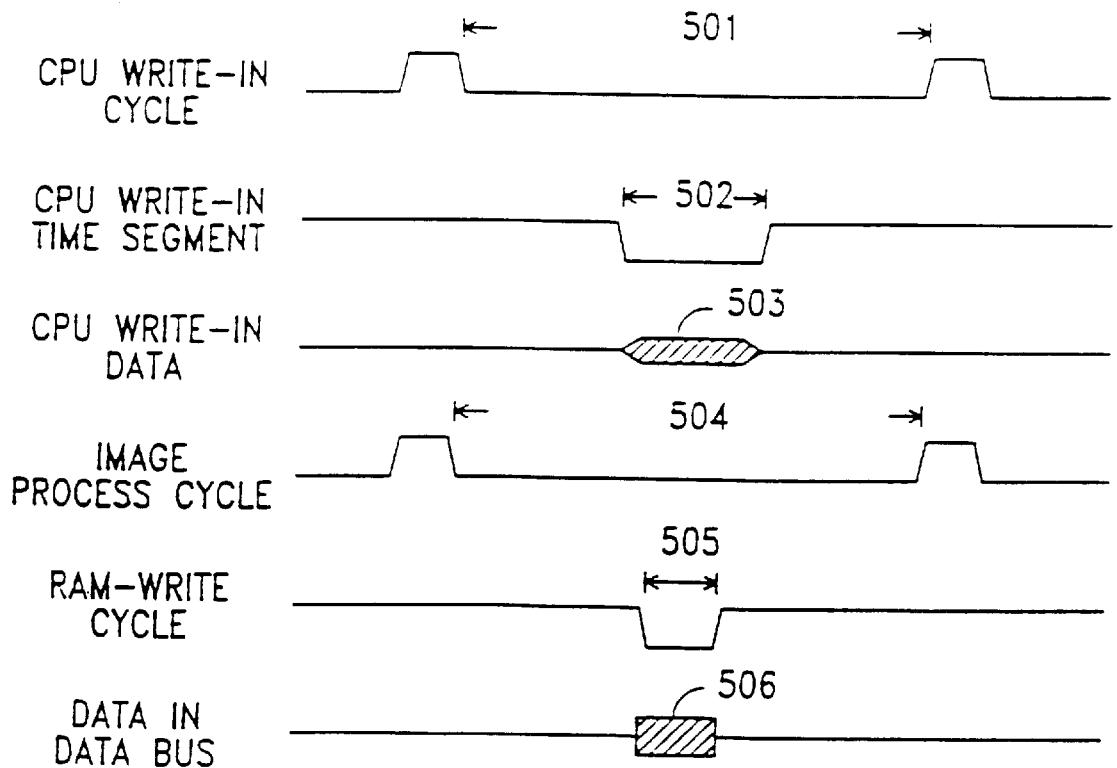
FIG. 5 shows a synchronous timing diagram of a CPU write cycle and an image processor write cycle.

FIG. 4 and FIG. 5 shows the timing diagram of the present invention performed in Intel 8031 CPU corresponding to FIG. 3. FIG. 4 shows a read cycle and FIG. 5 a write cycle. Under the control of the time controller 305, ALE signal, which is a control signal from the CPU, and the image process control signal are synchronized. The read/write cycle can be completed during the time segments 405 and 505 respectively. The image data I/O can be processed during the rest of time segments.

FIG. 4 shows the timing diagram of Intel 8031 CPU read cycle. During the time segment 402, CPU reads data. The Image processor 306 sends an image process control signal 404 which is synchronized to ALE signal 401. During the CPU read time segment 402 when CPU needs to read data according to the synchronization signal 405, the system will read data requested by CPU 304 from RAM 302 through the data bus 309. During the time segment 405, data in the CPU data bus 312 is latched. At the rising edge of the time segment 405, the system will store the data in the data read out means 311 for CPU 304 to read. CPU 304 will then read the data during the time segment 403 from the CPU data bus 312.

FIG. 5 shows the timing diagram of Intel 8031 CPU write cycle. During CPU write cycle 502, CPU 304 writes data to RAM 302. The Image processor 306 sends an image process control signal 504 which is synchronized to ALE signal 501. During the time segment 503, the data write in device sends the data to the data bus 309. The system will write data from data bus 309 to RAM 302 during the time segment 506 according to the synchronization signal 505.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A synchronization system for an image reading apparatus comprising:

a central processing unit (CPU) capable of generating Address Latch Enable (ALE) signals;

means for processing image data and generating image process control signals;

memory means for storing said image data;

means for generating synchronization signals based on said ALE signals and said image process control signals; and input/output (I/O) means for controlling said CPU to access said memory means in response to said synchronization signals.

2. The apparatus as claimed in claim 1, wherein said ALE signals and the machine cycles of said CPU are in synchronism.

3. The apparatus as claimed in claim 1, wherein said memory means is a random access memory (RAM).

4. A synchronization system for an image reading apparatus comprising;

memory means for storing image data and system data;

a plurality of data registers to which said image data and said system data are input;

an image processor arranged to receive said image data from said data registers, process said image data, output processed image data to said memory means, and generate image control signals;

a central processing unit (CPU) capable of generating Address Latch Enable (ALE) signals;

time controlling means for generating synchronization signals based on said ALE signals and said image control signals; and input/output (I/O) means for controlling said CPU to access said memory means in response to said synchronization signals.

5. The synchronization system as claimed in claim 4, wherein said memory means comprises a Random Access Memory (RAM).

6. The synchronization system as claimed in claim 4, wherein said CPU read data during CPU a read cycle via said I/O means in response to said synchronization signals.

7. The synchronization system as claimed in claim 4, wherein said CPU writes data during a CPU write cycle via said I/O means in response to said synchronization signals.

* * * * *